United States Patent
Close et al.

(10) Patent No.: US 8,060,257 B2
(45) Date of Patent: *Nov. 15, 2011

(54) NETWORK ARCHITECTURE FOR REMOTE ROBOT WITH INTERCHANGEABLE TOOLS

(75) Inventors: Eric Close, Edgeworth, PA (US); Adam Slifko, Pittsburgh, PA (US); Edison T. Hudson, Chapel Hill, NC (US); Ronald G. Genise, Wexford, PA (US)

(73) Assignee: RedZone Robotics, Inc., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/755,950

(22) Filed: Apr. 7, 2010
(Under 37 CFR 1.47)

(65) Prior Publication Data

US 2010/0191376 A1      Jul. 29, 2010

Related U.S. Application Data

(63) Continuation of application No. 10/956,679, filed on Oct. 1, 2004, now Pat. No. 7,720,570.

(51) Int. Cl.
*G06F 19/00* (2011.01)
(52) U.S. Cl. ...... 700/259; 180/22; 73/865.8; 405/184.1; 405/184.2; 405/184.3; 138/97; 700/245
(58) Field of Classification Search .................. 700/259, 700/245; 73/865.8; 405/184.1, 184.2, 184.3; 138/97
See application file for complete search history.

(56) References Cited

U.S. PATENT DOCUMENTS 3,562,642 A    2/1971   Hochschild 3,672,785 A    6/1972   Byrne
(Continued)

FOREIGN PATENT DOCUMENTS
AT           397432         8/1993
(Continued)

OTHER PUBLICATIONS

EPA Collection Systems O&M Fact Sheet Sewer Cleaning and Inspection, United States Environmental Protection Agency, Office of Water, EPA 832-F-99-031, Sep. 1999.

(Continued)

*Primary Examiner* — Thomas Black
*Assistant Examiner* — Wae Louie
(74) *Attorney, Agent, or Firm* — Reed Smith LLP

(57) ABSTRACT

Systems, methods and devices for the remote control of a robot which incorporates interchangeable tool heads. Although applicable to many different industries, the core structure of the system includes a robot with a tool head interface for mechanically, electrically and operatively interconnecting a plurality of interchangeable tool heads to perform various work functions. The robot and tool head may include several levels of digital feedback (local, remote and wide area) depending on the application. The systems include a single umbilical cord to send power, air, and communications signals between the robot and a remote computer. Additionally, all communication (including video) is preferably sent in a digital format. Finally, a GUI running on the remote computer automatically queries and identifies all of the various devices on the network and automatically configures its user options to parallel the installed devices. Systems according to the preferred embodiments find particular application in the pipeline arts. For example, interchangeable tool heads may be designed to facilitate inspection, debris clearing, cleaning, relining, lateral cutting after relining, mapping, and various other common pipeline-related tasks.

20 Claims, 10 Drawing Sheets

U.S. PATENT DOCUMENTS

| | | | |
|---|---|---|---|
| 3,732,701 A | 5/1973 | Lynch | |
| 4,025,360 A | 5/1977 | Horne | |
| 4,029,428 A | 6/1977 | Levens | |
| 4,197,908 A | 4/1980 | Davis et al. | |
| 4,281,447 A * | 8/1981 | Miller et al. | 279/156 |
| 4,285,239 A | 8/1981 | Heine et al. | |
| 4,406,030 A | 9/1983 | Platts | |
| 4,431,017 A | 2/1984 | Willemsen | |
| 4,437,526 A | 3/1984 | Gloor | |
| 4,442,891 A | 4/1984 | Wood | |
| 4,521,685 A | 6/1985 | Rebman | |
| 4,577,388 A | 3/1986 | Wood | |
| 4,613,812 A | 9/1986 | Gelston, II | |
| 4,630,676 A | 12/1986 | Long, Jr. | |
| 4,648,454 A | 3/1987 | Yarnell | |
| 4,701,988 A | 10/1987 | Wood | |
| 4,724,108 A | 2/1988 | Jurgenlohmann et al. | |
| 4,765,173 A | 8/1988 | Schellstede | |
| 4,819,721 A | 4/1989 | Long, Jr. | |
| 4,822,211 A | 4/1989 | Shinoda et al. | |
| 4,839,936 A | 6/1989 | Prange | |
| 4,862,808 A * | 9/1989 | Hedgcoxe et al. | 104/138.2 |
| 4,951,758 A | 8/1990 | Sonku et al. | |
| 4,955,951 A | 9/1990 | Nemoto et al. | |
| 5,018,545 A | 5/1991 | Wells | |
| 5,044,824 A | 9/1991 | Long, Jr. et al. | |
| 5,063,780 A | 11/1991 | Landry et al. | |
| 5,088,553 A | 2/1992 | Ralston et al. | |
| 5,094,570 A * | 3/1992 | LaCombe et al. | 408/130 |
| 5,105,882 A | 4/1992 | Ralston et al. | |
| 5,150,989 A | 9/1992 | Long, Jr. et al. | |
| 5,195,392 A | 3/1993 | Moore et al. | |
| 5,197,540 A | 3/1993 | Yagi et al. | |
| 5,203,646 A | 4/1993 | Landsberger et al. | |
| 5,272,986 A | 12/1993 | Smart | |
| 5,318,395 A | 6/1994 | Driver | |
| 5,329,824 A | 7/1994 | Carapezza | |
| 5,387,092 A | 2/1995 | Pettitt | |
| 5,454,276 A | 10/1995 | Wernicke | |
| 5,520,569 A | 5/1996 | Endoh | |
| 5,565,633 A | 10/1996 | Wernicke | |
| 5,571,977 A * | 11/1996 | Kipp | 73/865.8 |
| 5,574,223 A | 11/1996 | Kiefer | |
| 5,577,864 A | 11/1996 | Wood et al. | |
| 5,608,847 A | 3/1997 | Pryor | |
| 5,700,110 A | 12/1997 | Kamiyama et al. | |
| 5,736,821 A | 4/1998 | Suyama | |
| 5,742,517 A | 4/1998 | Van Den Bosch | |
| 5,773,984 A * | 6/1998 | Suyama et al. | 324/635 |
| 5,878,783 A * | 3/1999 | Smart | 138/93 |
| 5,940,920 A | 8/1999 | Hare et al. | |
| 5,947,051 A * | 9/1999 | Geiger | 114/313 |
| 5,947,213 A * | 9/1999 | Angle et al. | 175/24 |
| 5,960,882 A | 10/1999 | Polivka | |
| 5,975,878 A | 11/1999 | Wood et al. | |
| 5,992,247 A | 11/1999 | Manestar | |
| 6,026,911 A | 2/2000 | Angle | |
| 6,031,371 A * | 2/2000 | Smart | 324/220 |
| 6,039,079 A | 3/2000 | Kicst, Jr. | |
| 6,056,017 A | 5/2000 | Kamiyama et al. | |
| 6,068,725 A | 5/2000 | Tweedie et al. | |
| 6,082,411 A | 7/2000 | Ward | |
| 6,135,698 A * | 10/2000 | Bonora et al. | 414/416.01 |
| 6,141,810 A | 11/2000 | Allen et al. | |
| 6,155,363 A | 12/2000 | Matsumoto et al. | |
| 6,162,171 A * | 12/2000 | Ng et al. | 600/141 |
| 6,175,380 B1 | 1/2001 | Van Den Bosch | |
| 6,243,657 B1 | 6/2001 | Tuck et al. | |
| 6,377,734 B1 * | 4/2002 | Mayr et al. | 385/100 |
| 6,378,627 B1 | 4/2002 | Tubel et al. | |
| 6,386,797 B1 | 5/2002 | Gearhart | |
| 6,427,602 B1 * | 8/2002 | Hovis et al. | 104/138.1 |
| 6,431,270 B1 | 8/2002 | Angle et al. | |
| 6,450,104 B1 * | 9/2002 | Grant et al. | 104/138.2 |
| 6,491,612 B1 * | 12/2002 | Kurup et al. | 483/16 |
| 6,684,706 B2 | 2/2004 | Knight et al. | |
| 6,695,013 B2 | 2/2004 | Warren | |
| 6,697,710 B2 | 2/2004 | Wilcox | |
| 6,745,955 B2 | 6/2004 | Kronz | |
| 6,843,317 B2 | 1/2005 | Mackenzie | |
| 6,853,200 B2 * | 2/2005 | Munser et al. | 324/642 |
| 6,887,014 B2 | 5/2005 | Holland | |
| 6,956,348 B2 | 10/2005 | Landry et al. | |
| 6,964,309 B2 | 11/2005 | Quinn et al. | |
| 7,009,698 B2 | 3/2006 | Drost et al. | |
| 7,042,184 B2 * | 5/2006 | Oleynikov et al. | 318/568.12 |
| 7,073,979 B2 | 7/2006 | McGrew et al. | |
| 7,126,303 B2 * | 10/2006 | Farritor et al. | 318/568.12 |
| 7,131,791 B2 * | 11/2006 | Whittaker et al. | 405/184.2 |
| 7,137,465 B1 * | 11/2006 | Kerrebrock et al. | 180/22 |
| 7,210,364 B2 * | 5/2007 | Ghorbel et al. | 73/865.8 |
| 7,386,365 B2 * | 6/2008 | Nixon | 700/245 |
| 7,434,757 B2 | 10/2008 | Beckham | |
| 7,720,570 B2 * | 5/2010 | Close et al. | 700/245 |
| 2002/0062177 A1 | 5/2002 | Hannaford et al. | |
| 2003/0089267 A1 * | 5/2003 | Ghorbel et al. | 104/138.1 |
| 2003/0172871 A1 * | 9/2003 | Scherer | 118/306 |
| 2003/0198374 A1 | 10/2003 | Hagene et al. | |
| 2003/0212472 A1 | 11/2003 | McKee | |
| 2003/0216836 A1 | 11/2003 | Treat et al. | |
| 2004/0006864 A1 * | 1/2004 | Batrin | 29/592 |
| 2004/0055746 A1 | 3/2004 | Ross et al. | |
| 2004/0088080 A1 * | 5/2004 | Song et al. | 700/259 |
| 2004/0175235 A1 | 9/2004 | Whittaker et al. | |
| 2005/0104600 A1 | 5/2005 | Cotton | |
| 2006/0060216 A1 | 3/2006 | Woo | |
| 2006/0074525 A1 * | 4/2006 | Close et al. | 700/245 |
| 2006/0287831 A1 * | 12/2006 | Sheth et al. | 702/35 |
| 2006/0290779 A1 | 12/2006 | Reverte et al. | |
| 2007/0153918 A1 | 7/2007 | Rodriguez | |

FOREIGN PATENT DOCUMENTS

| | | |
|---|---|---|
| EP | 462527 | 12/1991 |
| GB | 2091611 | 8/1982 |
| JP | 10286878 | 10/1998 |

OTHER PUBLICATIONS

Remote Orbital Installations LLC, Website, roi360.com/equipment. html; date unknown.

Remote Orbital Installations LLC, Transpod Product Brochure; date unknown.

Cues Inc., Cues-IMX Product Brochure; date unknown.

Cues Inc., Quick ZoomCam Product Brochure; date unknown.

Hirose, et al., Design of In-Pipe Inspection Vehicles phi50, phi150 pipes, IEEE, pp. 2309-2314, 1999.

Kawaguchi, et al., An Efficient Algorithm of Path Planning for an Internal Gas Pipe Inspection Robot, IEEE, pp. 1155-1160, 1992.

Bertetto, et al., Robot Flessibile a Basso Costo Per Isperzioni Tuni, Internet, pp. 1477-1483, 2001.

Torboin, Advanced Inspection Robot for Unpiggable Pipelines, Internet, pp. 1-9, 2006.

Lawson S.W. Lawson and J.R.G. Pretlove, Augmented Reality for Underground Pipe Inspection and Maintenance, Mechatronic Systems and Robotics Research Group, 1998.

Roth H & Schilling K., Inspection and Repair Robots for Waste Water Pipes—A Challenge to Sensorics and Locomotion, IEEE, 1998.

Schenker P., Advanced Man-Machine Interface and Centro, Architecture for Dexterous Teleoperations, IEEE, 1991.

Jinno, et al., Force Controlled Grinding Robot System for Unstructured Tasks, IEEE, Jul. 1992.

Vukobratovic, Contact Control Concepts in Manipulation Robots—An Overview, IEEE, Feb. 1994.

Zeng, et al., An Adaptive Control Strategy for Robotic Cutting, IEEE, 1997.

Gu, et al., Interpretation of Mechanical Impedance Profiles for Intelligent Control of Robotic Meat Processing, IEEE, 1996.

Jung, et al., Adaptive Force Tracking Impedance Control of Robot for Cutting Nonhomogeneous Workpiece, IEEE, 1999.

Wang, et al., Application of Force Control on the Working Path Tracking, Journal of Marine Science and Technology, 2002.

Xiao, et al., Sensor-Based Hybrid Position/Force Control of a Robot Manipulator in an Uncalibrated Environment, IEEE, 2000.

Musliner, et al., Execution Monitoring and Recovery Planning with Time, 1991, pp. 1-4.

Jeng, et al., Reliable Automated Manufacturing System Design Based on SMT Framework, 1998, Internet, pp. 1-27.

Schempf, et al., Neptune: Above-Ground Storage Tank Inspection Robot System, 1995, IEEE, pp. 1-7.

Jin-Wu, et al., A Pipline Inspection Micro Robot Based on Screw Motion Wheels, Internet, 2000, pp. 1-4.

Kawaguchi, et al., Internal Pipe Inspection Robot, 1995, IEEE, pp. 1-6.

Ryew, et al., Inpipe Inspection Robot System with Active Steering Mechanism, 2000, IEEE, pp. 1652-1657.

Ono, et al., Development of an In-pipe Inspection Robot Movable for a Long Distance, 2001, Internet, pp. 1-4.

Choi, et al., Development of Articulated Robot for Inspection of Underground Pipelines, 1999, Internet, pp. 1-8.

Grobmann, et al., A Robot Control System Integrating Reactive Control, Reasoning, and Execution Monitoring, 2002, Internet, pp. 1-16.

* cited by examiner

NETWORK ARCHITECTURE FOR REMOTE ROBOT WITH INTERCHANGEABLE TOOLS

CROSS-REFERENCE TO RELATED APPLICATION

This application is a continuation of, and claims the benefit under 35 U.S.C. §120 of the earlier filing date of, U.S. patent application Ser. No. 10/956,679 filed on Oct. 1, 2004.

BACKGROUND OF THE INVENTION

The present invention relates generally to systems, devices and methods related to the remote control of robots, and, more specifically, the present invention relates to a system architecture utilizing a robot with interchangeable tools used for pipeline rehabilitation.

The use of robotic devices or robots to perform tasks that are either too difficult, too dangerous, or too repetitive in order to gain efficiencies over similar manual processes is well known in many arts. These robots are typically either tele-operated (an operator acting on visual cues or visual servo feedback), operator assisted, forced multiplication (one operator overseeing a plurality of robots) or autonomous (no human intervention).

In most of these industries, specific robots have been custom-designed to perform each individual task that is automated. Such custom-designed machines are very expensive to build and maintain, and do not take advantage of the similarities between the various tasks that need to be performed. In short, most robotic applications are special purpose, and these robots are not designed to be flexible, self-configurable, and easy to operate.

One particular application that has seen attempts at utilizing robots is in the area of tanks and pipelines (conduits). Since many pipes are of a standard size and regular shape, it is considered less difficult to design robots that can navigate and perform work within the confines of these structures. Therefore, although the concepts of the present invention find application across a wide variety of industries, the examples given herein will be directed to robots utilized inside pipeline networks, as described in more detail below.

Various pipeline networks are used in a variety of different technological disciplines. For example, largely subterranean potable water pipeline networks deliver clean water to homes and businesses, and sewer pipeline networks guide used water and wastes away from these same locations for further treatment or disposal. Likewise, natural gas, petroleum and chemical pipelines operate in a similar manner. In general, pipeline networks are used to guide an almost limitless variety of liquids and gases from one location to another, either under pressure or by the force of gravity.

A section of a conventional pipeline network for subterranean sewers is shown in FIG. 1. FIG. 1A shows an isometric view of the pipeline network, and FIGS. 1B and 1C show front (down the longitudinal axis) and side views, respectively. As seen in FIG. 1, a main line 10 typically traverses in a longitudinal direction with a variety of different lateral lines 12, 14 intersecting the main 10 at various locations. The lateral connections with the main 10 occur at various angles in planes co-linear with the longitudinal axis (FIG. 1C) and perpendicular to the longitudinal axis (FIG. 1B). A lateral typically may intersect with the main 10 at any angle within the upper hemisphere of the main.

The pipeline network also includes a plurality of surface manholes (not shown) that provide access to the subterranean pipeline network at various locations. For sewer pipelines, a distance of 300 feet between successive manhole access points is common. These access points intersect with the main as vertically intersecting laterals.

After years of wear, the walls of the pipelines begin to crack, leak and generally deteriorate, and this wear may adversely affect use of the pipe. As such, various processes have been developed to rehabilitate these pipelines and provide for a longer service life. As used herein, the term "rehabilitation" includes all active tasks performed on a pipe as part of the relining process including inspection, cleaning, debris clearing, relining, and the like. One common rehabilitation method involves relining the interior walls of pipes with an epoxy or resin-impregnated felt liner that is prefabricated and rolled in the form of a rolled-up sock (i.e., one end open and one end closed). The liner is fed down through a manhole access point and is guided into the pipeline main. Pressurized water or steam is then forced into the open end of the rolled liner forcing it to unroll and unfurl down the length of the main. The far end of the liner is tied off or closed to allow for the expansion of the felt liner against the inside of the pipe wall.

The relining process is typically performed on pipes that have been prepared for relining by removing serious flaws, such as collapses and extensive debris. In these cases, a machine or other means, depending on the size of the pipe, is used to assess and repair the main and/or lateral (extending to a house or building) before relining.

After unrolling, the felt liner, often referred to as Cured In Place Pipe (CIPP), is filled with pressurized heated water and is allowed to cure for several hours depending on the CIPP length, thickness and other relining factors. For an 8" sewer main, a typical cure time may be three hours. After curing, the closed end of the liner is cut open allowing the water to proceed down the main out of the liner. The result is a relined, and hence rehabilitated, pipe that lasts for up to 50 more years with regular maintenance. This process is obviously much cheaper than excavating and replacing the mains of subterranean pipe networks.

At this point, each of the lateral connections with the main is now covered over with the cured epoxy lining. Therefore, to restore service to the houses and other buildings connected to the main through the laterals, new openings in the Cured In Place Pipe must be cut at each lateral connection. Typically, for smaller pipes that do not allow for man-entry within the mains for cutting (e.g., smaller than 24" in diameter), a small machine is used to cut the laterals open after curing. The machine includes an air-powered routing bit with three axes of manipulation that is operated from the surface. Via operator visual servo feedback (closed circuit TV), the cutting machine is positioned in front of a lateral. This signaling and feedback is all analog.

To accomplish the lateral cutting task using conventional methods, the operator uses a camera view from an inspection sled which is being towed directly in front of the lateral cutting machine which provides a perspective view of the cutting operation. Typically, a conventional video feed (CCTV—analog) is used for tele-operation of the machine. The operator (at the surface) uses the analog video image to look for a "dimple" or depression in the newly cured liner caused by the pressurized water indenting the soft felt liner at the location of most laterals. In some cases, a lateral may not cause a dimple in the liner. In these cases, a pay-out sensor may be used to generally identify the location of each lateral prior to lining, and the lateral cutting machine may be stopped at each of the recorded locations after lining and attempt to drill or punch a lateral hole at each of these locations. In either case, the conventional method lacks a great deal of precision.

Throughout this pipe relining or rehabilitation operation (before and after relining), remotely controlled robots may be used. For example, the initial inspection may be performed based on a robot with camera capabilities. Further, large or small debris may be cleared out of the pipeline via some sort of robotic device. Finally, as explained above, the lateral cutting operation, as well as the sealing or inspection operations, may also be automated.

However, these prior robotic application do not present a universal architecture and robotic device that can be used to perform these, and other similar tasks using a robot with interchangeable tool heads. These prior art systems do not include self-recognizing components connected to the network architecture. Finally, these prior systems do not include a Graphical User Interface ("GUI") that builds itself based upon the recognition of robotic components and robotic functionality. In fact, conventional interfaces are nothing more than analog overlays and are not GUIs at all. These and other disadvantages of the prior art are addressed by the present invention.

Although shown and described herein with respect to sewer pipelines, the present invention could also be used in other industries, such as general industrial, water, gas, or chemical pipes, as well as non-pipe industries such as construction. Those skilled in the art can easily adapt the features of the present invention to these and other alternative uses within the scope of this patent.

SUMMARY OF THE INVENTION

In accordance with at least one preferred embodiment, the present invention provides systems, methods and devices for the remote control of a robot which incorporates interchangeable tool heads. Although applicable to many different industries, the core structure of the system includes a robot with an attachment interface for mechanically, electrically and operatively interconnecting a plurality of interchangeable tool heads and sensors to perform various work functions.

The robot and attachment (tool head or sensor) typically include a first level of local digital feedback that provides a quick feedback response for certain time-sensitive signaling decisions. The robot is also communicatively connected to a remote computer (for example a computer at the surface when a robot is exploring subterranean pipes) for a slightly slower feedback loop. This secondary feedback may be used for slightly less time-critical decisions or when human interaction is necessary. Finally, groups of these robot/remote computer systems may all be wired or wirelessly connected via a larger network, such as the Internet, to provide truly remote control of a series of robots with interchangeable tool heads.

These systems have several preferred options. For example, a single umbilical cord may be used to send power, air, and communications signals between the robot and the remote computer (the power and air may also be locally generated at the robot). Additionally, all communication (including video) is preferably sent in a digital format. Also, a GUI running on the remote computer preferably automatically queries and identifies all of the various devices on the network and automatically configures its user options to parallel the installed devices. This "plug-and-play" architecture provides various advantages over the prior art.

Systems according to the preferred embodiments find particular application in the pipeline arts. For example, interchangeable tool heads may be designed to facilitate inspection, debris clearing, cleaning, relining, lateral cutting after relining, mapping, and various other common pipeline-related tasks. This single general architecture is scalable and adaptability in a plurality of ways as defined in the detail description.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein.

DETAILED DESCRIPTION OF THE INVENTION

Figure 1A:
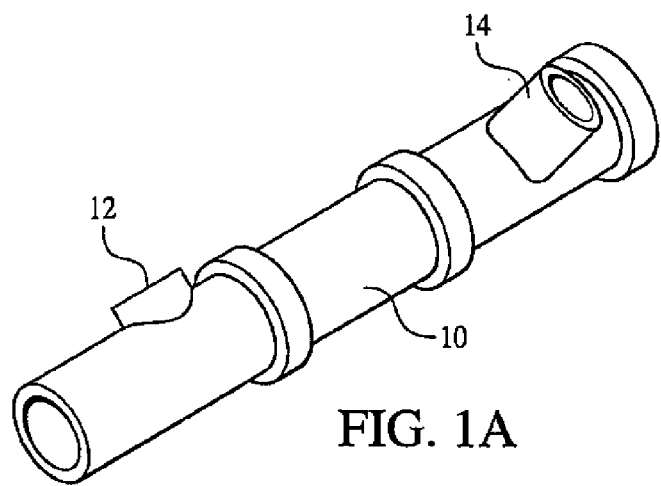
FIG. 1 shows a section of a conventional pipeline network.
Figure 1B:
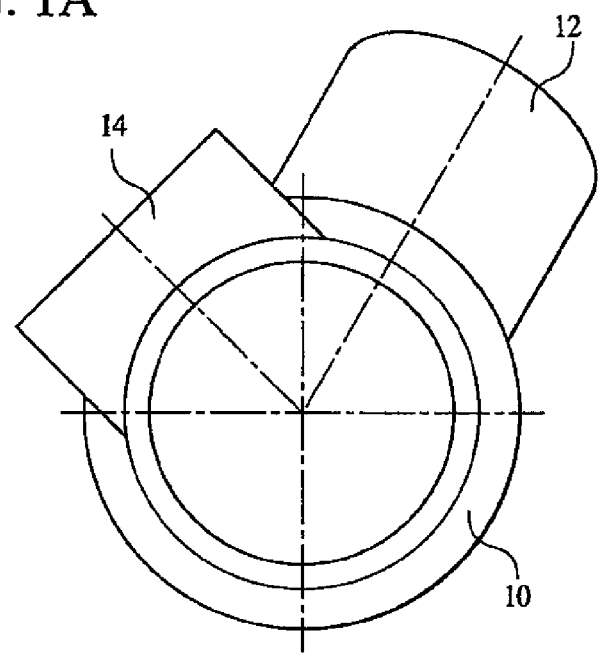
Figure 1C:
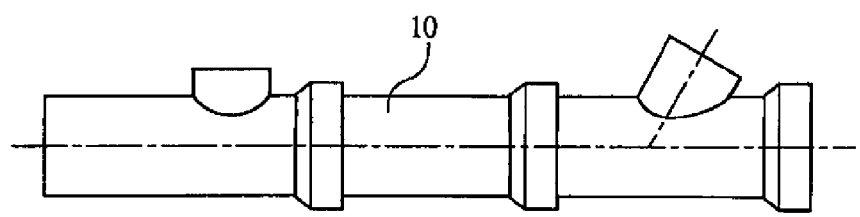

It is to be understood that the figures and descriptions of the present invention have been simplified to illustrate elements that are relevant for a clear understanding of the invention, while eliminating, for purposes of clarity, other elements that may be well known. Those of ordinary skill in the art will recognize that other elements are desirable and/or required in order to implement the present invention. However, because such elements are well known in the art, and because they do not facilitate a better understanding of the present invention, a discussion of such elements is not provided herein. The detailed description will be provided hereinbelow with reference to the attached drawings.

The present invention is generally directed to a network architecture for controlling robotic devices, wherein the robotic device includes a universal interface for attaching a variety of different tool heads and sensors (collectively "attachments") thereto. It should be noted that, although the terms may be considered similar, the present description uses the term "tool head" to denote an attachment that is used to perform some type of work (but may also include sensors) in distinction to a "sensor" which would only be used to sense and return some type of data. Each interchangeable tool head preferably performs a different work function such as imaging (via a camera), digging, cutting, grinding, collecting data, and/or an almost limitless variety of other tasks. Depending on the industry, these tasks may be very complicated or quite simple.

In addition to the interchangeable attachments, the robot of the present invention also optionally includes a variety of other sensors on the robot itself that may be useful in a particular situation. These sensors may be used to sense conditions that are fed back to a local controller (such as a local speed or position controller) or the data may be sent back to an operator using a remote computer. Again, a variety of different sensors and sensor orientations (as part of the robot or attachment) may be utilized, with flexibility being the key.

High level control and monitoring of the robotic device preferably occurs via a remote computer, with signals traveling through an umbilical attached between the remote computer and the robot. Sensor data, video, audio, and position feedback information may be collected from the robot in real-time, and commands may be sent back to the robot from the remote computer. An operator utilizes the remote computer via a graphic display or GUI.

It should be noted here that the use of the term "real-time" within this application does not denote instantaneous time. The concept of what constitutes communication in "real-time" depends upon number of different factors including the given application and the time constraints for that application. In fact, an asynchronous communication link could be considered real-time if on a very high speed network.

In one preferred embodiment of the present invention, all data and signals transmitted between the remote computer and the robot are in a digital format to increase data throughput and to facilitate the easy use of a computer-based GUI. Preferably, the entire system is plug-and-play: the controller recognizes when new components are added to or changed on the robot. In an optional feature, the GUI software uses the detected robotic components and adjusts the control options offered to the operator automatically, based upon safety guidelines, feasibility and other rules that prohibit certain actions with certain robots.

Although this type of flexible robot and system architecture may be used in a variety of different applications, because the various tasks involved are so similar, the present invention finds particular applicability with respect to pipeline robots. As such, and without limiting the scope of the present invention to any particular application, a more detailed description of an exemplary robot, system architecture, and methods for using such a robot in a pipeline are now provided.

An Exemplary Pipeline Device

In a pipeline-based embodiment, the present invention comprises a robot with interchangeable tools and sensors that communicate with a remote (often topside) computer to accomplish certain tasks. Through the use of digital control, automatic recognition of robot components, and other features, the present invention provides a universal platform for accomplishing tasks via a robot that is either tele-operated or autonomous in nature. By breaking down the robot and its control algorithm into its basic parts, the present invention may be best understood.

Figure 2:
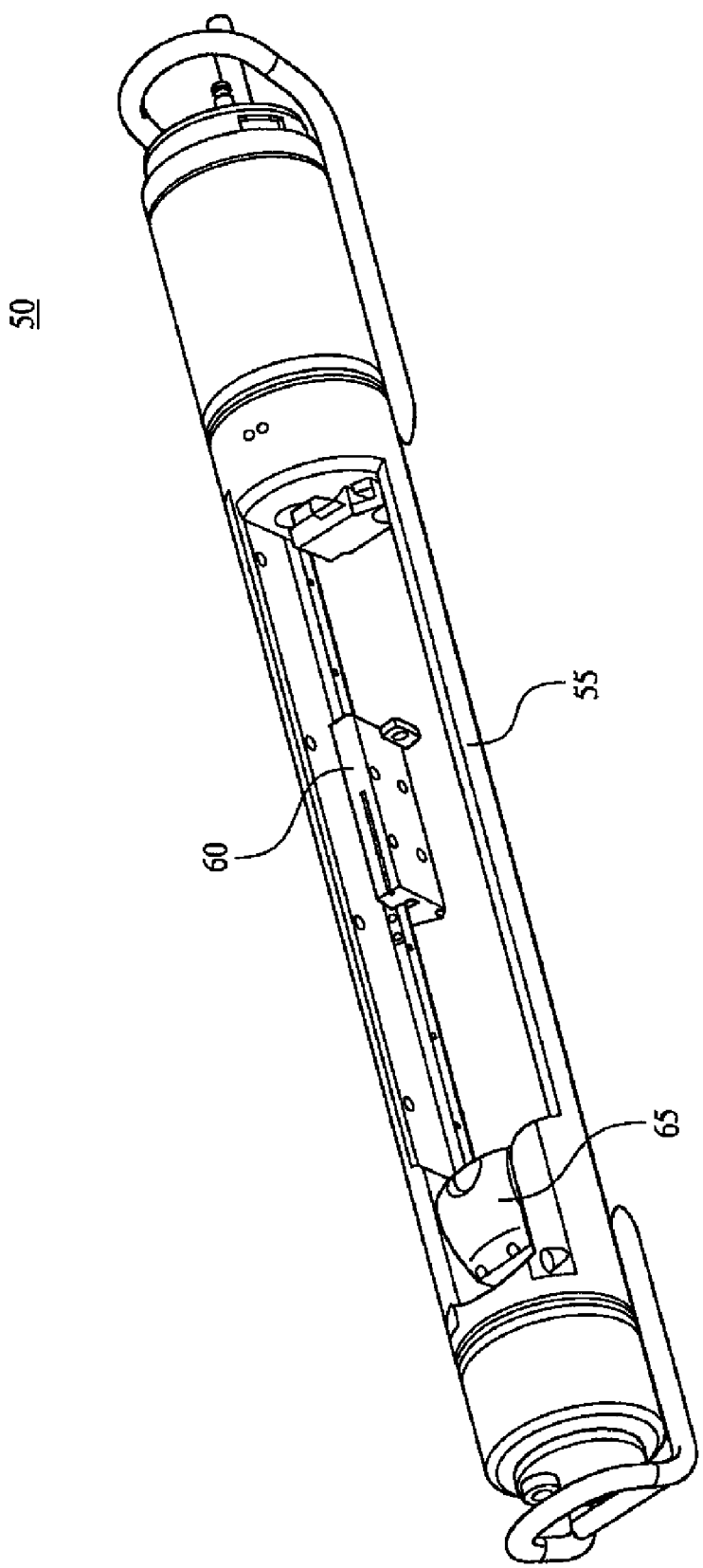
FIG. 2 is an exemplary robot with interchangeable tools.

FIG. 2 shows one exemplary embodiment of a universal platform robot 50 according to the present invention. The robot 50 generally includes a base robot chassis or bed 55 that provides both an anchor for the robot during performance of various tasks as well as a common platform onto which the multiple function-specific tool heads (or sensors) may be attached. By connecting various tool heads (with different motors, sensors, etc.) to the tool head interface 60 (also known as an "attachment interface") of the base robot chassis 55, the functionality of the robot changes 50.

The robot 50 of FIG. 2 (and in most applications) is interested in 6 degrees of movement. Specifically, the robot 50, including its attached sensors and tools, has the ability to move in three dimensions throughout the pipe, and the tool head (or more particularly the active end of the tool head) moves in three additional directions with respect to the base chassis. Therefore, to accurately perform work utilizing the remote robot, each of these degrees of freedom must be accurately controlled.

The robot 50 of FIG. 2 shows one exemplary clamping mechanism 65 in which opposing ends of the robot provide the support and clamping surfaces. In this example, clamps 65 are hydraulically extended from the side portions of each opposing end of the robot 50 onto or into the side walls of the pipe, anchoring the robot in place to perform work. The anchoring mechanism may also be an inflatable bag or other means. Alternatively, a cantilevered (both supports on the same side of the robot) or a single-ended support structure could be utilized for certain applications.

Figure 3:
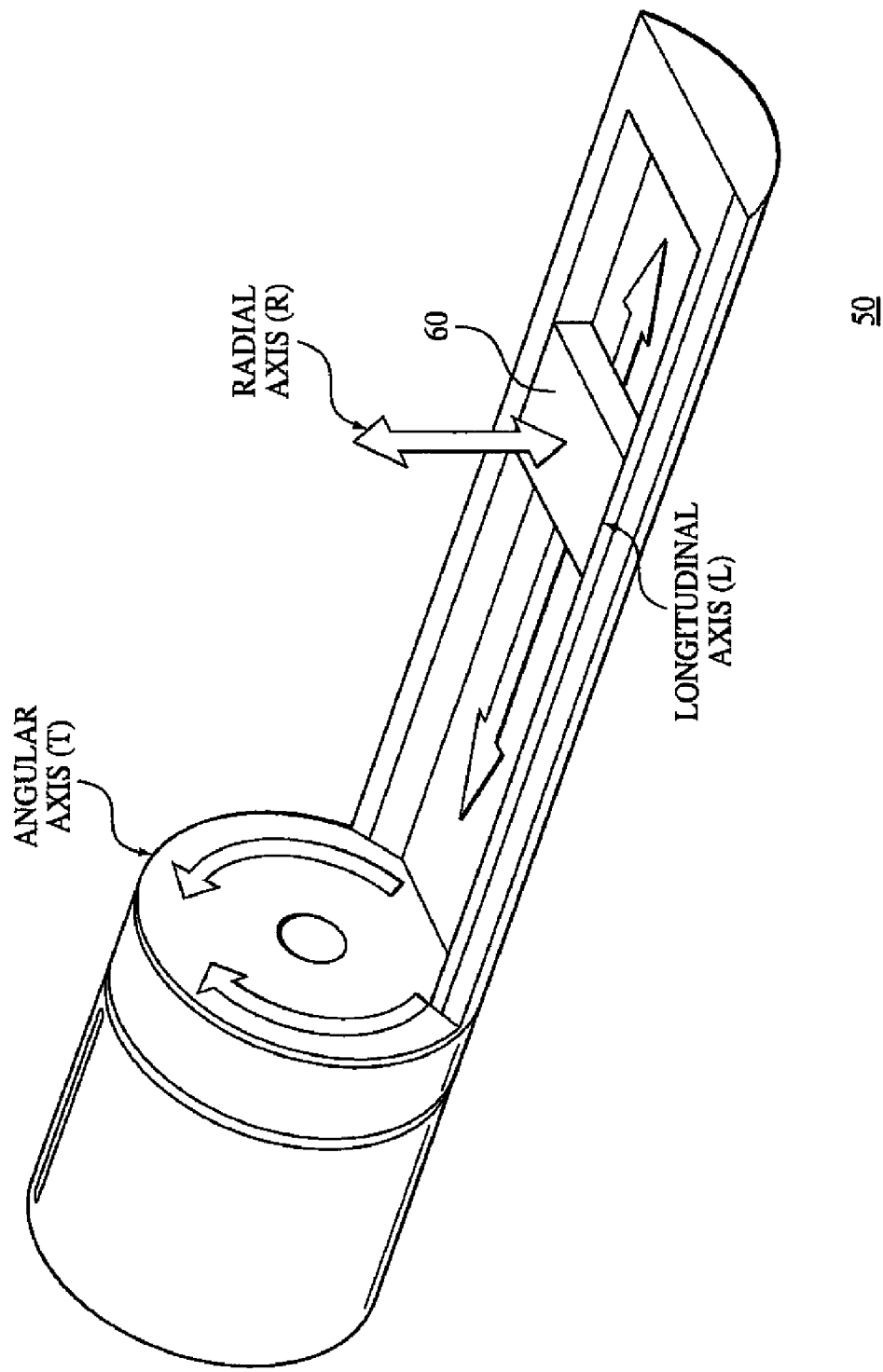
FIG. 3 shows the primary axes of movement of the tools and sensors that are attached to an exemplary robot.

Once in place, FIG. 3 shows the primary axes of movement of the tools and sensors that are attached to the robot 50. Specifically, the tool head interface 60 is shown as having rotational movement (angular axis T), and longitudinal movement along the long axis of the robot 50 (longitudinal axis L). Each of these degrees of movement may be accomplished via the robot itself (exclusive of the tool attached thereto). For example, the longitudinal movement (L) may be accomplished using a direct or ball screw drive attached to a motor. The longitudinal (L) and angular (T) axes allow for movement generally parallel to the inner surface of the pipe (e.g., moving a lateral cutter around the edges of a lined lateral).

Additionally, a third degree of movement is shown along the radial axis (R) perpendicular to the longitudinal axis (L). Since this movement is not always necessary, radial movement is typically accomplished via the attached tool head, if necessary. This radial movement is perpendicular to the inner surface of the pipe (e.g., moving a lateral cutter into and out of the liner surface).

Since this robot is specifically designed for use within pipes, conduits and the like, these three axes of motion are preferred so that cutting and other tools may easily track the curvature of the inner diameter of the pipes. The movement along these three axes is preferably accomplished using closed loop control for position, velocity and torque performed locally at the robot. By providing motion to the tool head interface (and therefore the interchangeable tools and sensors themselves), an almost limitless variety of work and sensing functions may be accomplished.

At the heart of the universal platform robot is the tool head interface 60. This tool head interface provides a common interface for all of the various tools and sensors that may be attached to the robot to carry out different tasks. The tool head interface provides mechanical coupling with repeatable location and rotation, an electrical interface to provide power to motors and other actuators that reside on the various attached tools, and a pneumatic drive supply for an air motor and/or pneumatic air supplies for air logic and solenoid-based actuators. It is noted that in other embodiments the power, air or other signals may be locally generated, at or on the robot or tool/sensor itself.

In addition to these connection-specific features, the tool head interface 60 preferably includes a control interface to provide closed-loop control, digital inputs and outputs (to/from an attached tool or sensor), "spare" lines for specialized tool heads (e.g., RS-232 or RS-485 signals that provide the flexibility to interconnect with additional sensors, tools, etc.), and sealing of all electrical and mechanical interfaces once a tool is connected thereto. The tool head interface 60 is the fundamental connection point between the interchangeable tools of the present invention and the robotic device.

Figure 4:
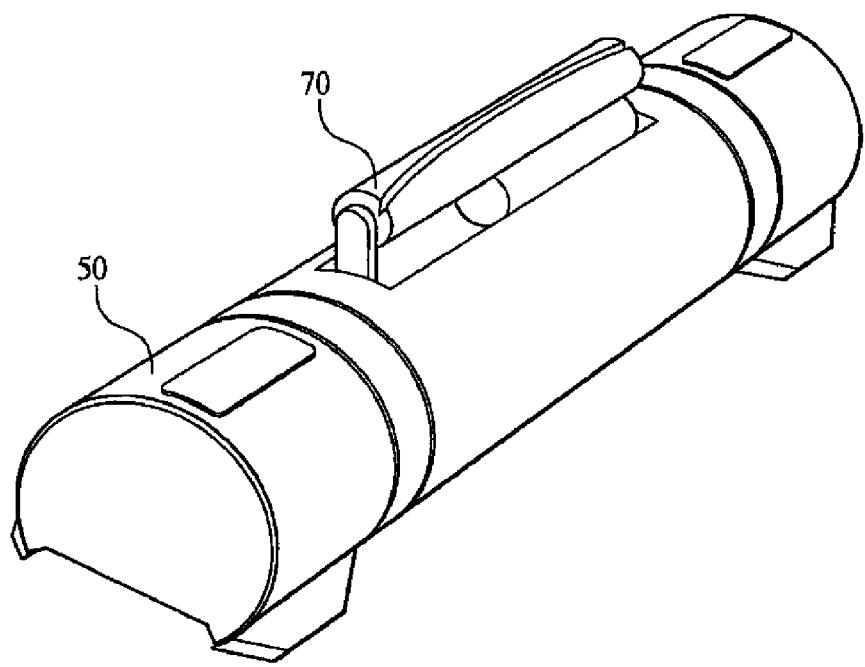
FIG. 4 shows a robot with a barrel cutting tool attached.
Figure 5:
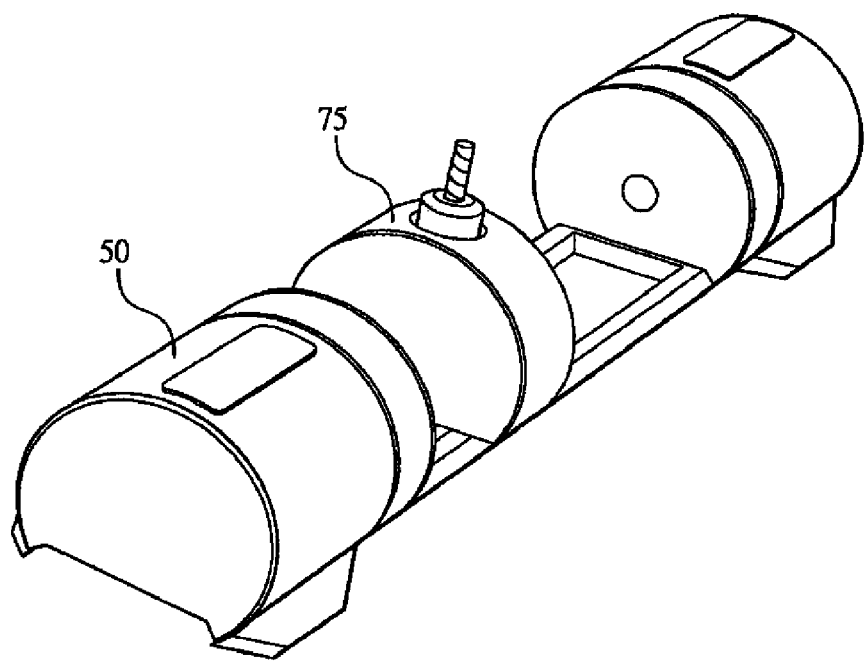
FIG. 5 shows a robot with a lateral cutting tool attached.

Different interchangeable tools or tool heads are designed to perform different tasks. For example, in the pipeline art described above, tools may be utilized at various stages of a pipeline rehabilitation project such as: video survey and/or range mapping; reference marker implantation and registration; obstruction cutting (roots, intruding laterals, mortar flows); lateral sleeve/mold loading; lateral sleeve/mold grinding and reinstatement; lateral aperture reopening; and other job-specific development tasks. As two exemplary tools attached to the robot shown in FIG. 2, FIG. 4 shows a robot 50 with a barrel cutting tool 70 attached, and FIG. 5 shows a robot with a lateral cutting tool 75 attached.

System Architecture

Figure 6:
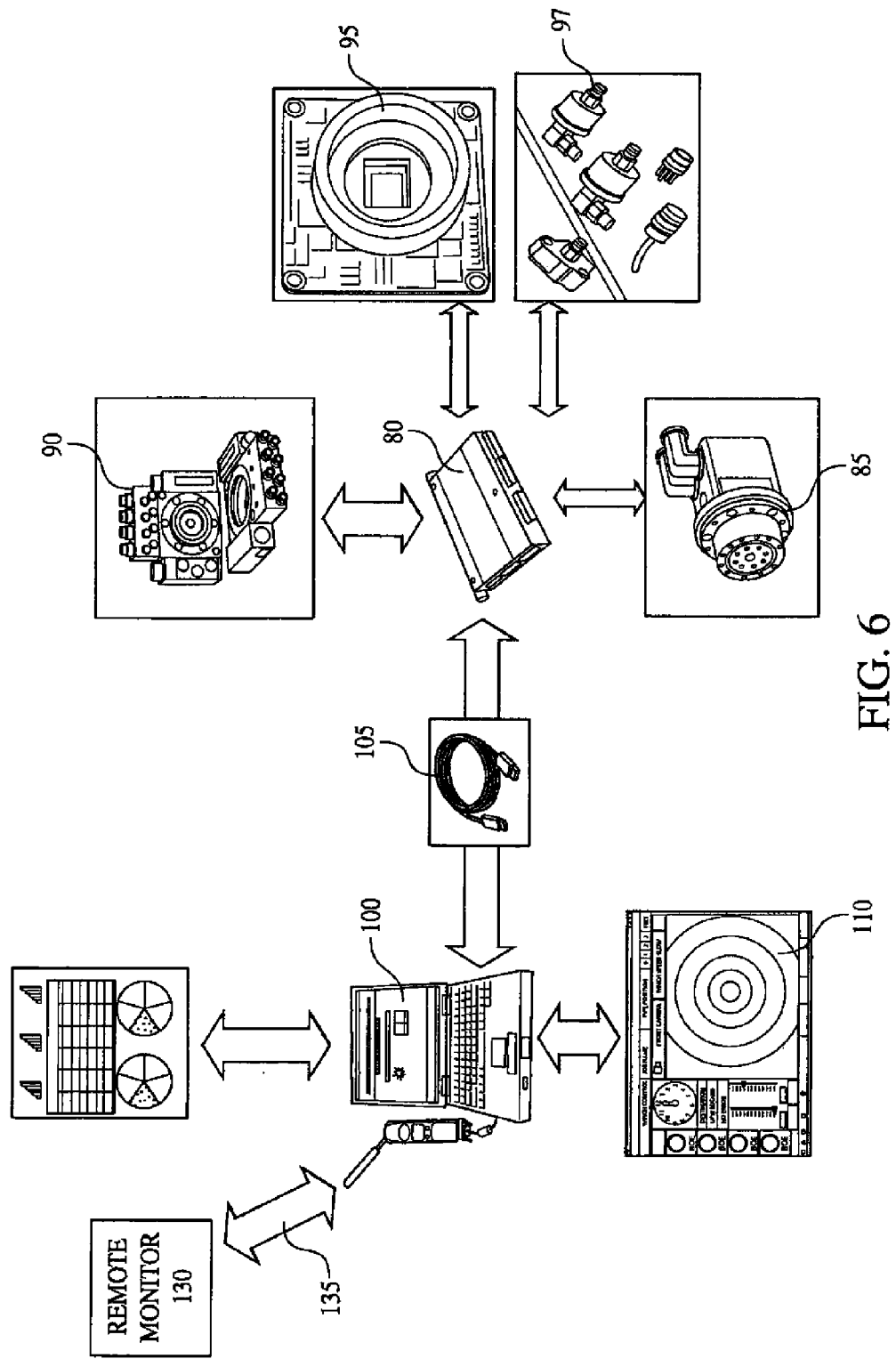
FIG. 6 depicts an exemplary network architecture for controlling a robot with interchangeable tools.

In a tele-operated environment, the robot is in communication with a remote computer (typically at the surface or "topside" which is typically more than 25 meters from said robot) which receives information about the robot's current project. FIG. 6 shows a high level network topology for use with a preferred embodiment of the present invention. In FIG. 6, a remote computer 100 is shown connected to the robot components through an umbilical cord 105. Moreover, the communication between the robot and tool head may be fiber, wired (coax) or wireless (which may not require an umbilical at all).

In more detail, the network architecture is centered around a distributed controller 80 which is the primary connection point between the remote computer 100 and the robot. As shown in FIG. 6, the distributed controller 80 is connected to one or more motors or mobility devices 85 that enable the movement of the robot according to FIG. 3. These motors 85 move and rotate the various attached tools, and preferably each include encoders or some other type of feedback that may be utilized in a closed loop configuration, onboard the robot, to impart motion on the attached tool or sensor.

The distributed controller 80 is also shown connected to the tool head interface 90. This tool head interface 90 is shown as including a power take off (to provide movement to a tool shaft) and quick connect mechanical interconnections with an attached tool (not shown). The distributed controller 80 is also shown connected to multiple digital cameras 95 (real-time cameras) and a variety of different plug-and-play sensors 97. The cameras 95 may view in the forward or reverse longitudinal directions, towards the tool, or in any other direction. The onboard sensors 97 may sense a variety of different environmental (e.g., temperature, PH, and gas composition) and robot-specific characteristics (e.g., robot tilt, temperature, humidity and pneumatic air pressure).

On the other side of the distributed controller 80 of FIG. 6 is shown an umbilical cord 105 connected to the remote computer 100. The umbilical cord 105 preferably provides power, communications, and services to the robot from the topside operations center (including the remote computer). For example, the umbilical may provide: data communications using IEEE-1394 using MMF or CAT-6 cabling (over fiber or wire); real-time digital video for up to two simultaneous video streams; control signaling for all digital I/O and data acquisition; motion commands and feedback to/from the robot motors 85; electric power for motors and control logic; and pneumatic power for air-driven motors on tools and air logic—the electricity and air provided to the robot finding their source in topside power sources and compressors. Preferably, the umbilical 105 includes quick connect/disconnect housings and is wrapped with woven fiberglass or other resilient material to withstand wear. As described above, this umbilical 105 may also not be necessary if communication is wireless and if power and air (if necessary) is located on the robot itself.

At the other end of the umbilical 105 shown in FIG. 6 is a remote personal computer 100 that provides the user interface 110 to the robot. For example, as described in more detail below, the computer 100 may include a joystick to provide control of the robot and a screen to show the real-time results of the various sensors, cameras and the like onboard the robot. As described below, an additional communications layer, for example over the Internet 135, may provide a high level remote monitoring 130 function to the system.

Figure 7:
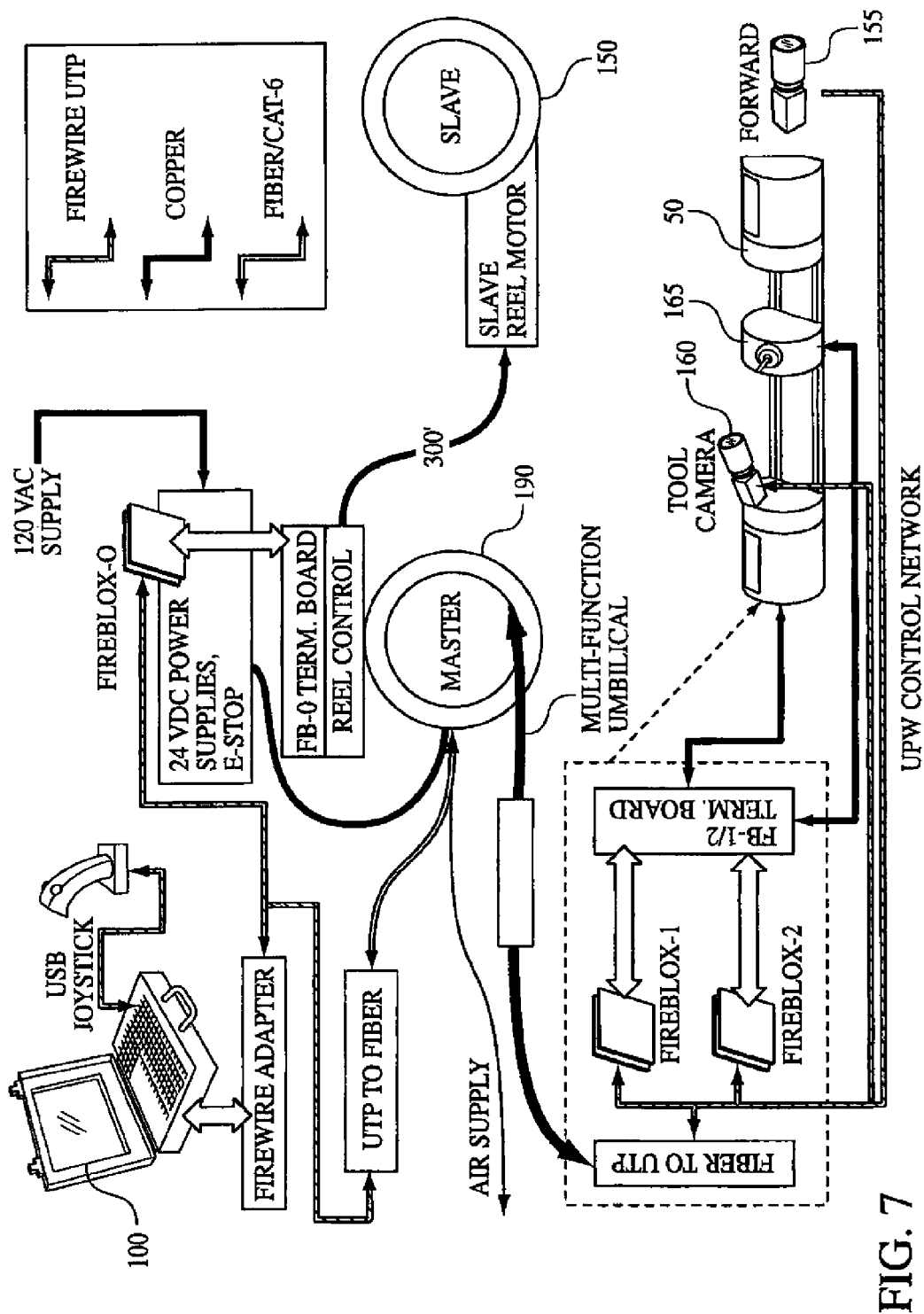
FIG. 7 shows an exemplary network architecture including a winch.

FIG. 7 shows the use of the present invention with a tethered robot 50 and a topside remote computer 100. As seen in FIG. 7, the robot is connected to master 140 and slave 150 motorized reel spools which will pull the robot in the longitudinal direction according to conventional practices. Preferably, these spools have encoders and feedback algorithms that provide closed loop control of the positioning of the robot within the pipe. The robot shown in FIG. 7 includes a forward looking camera 155, a tool camera 160, and a lateral cutting tool 165 attached to the tool head interface. Once the master/slave winches 140, 150 have positioned the robot near a desired location, the multiple degree of freedom movement of the tool may take place.

It should be noted at this time that although operations within a main pipe are the basis of the preferred embodiments, the present invention is equally applicable to lateral pipes and manholes. All of the same tasks (e.g., inspection, cleaning, grouting, grappling, etc.) available in the main, may also take place in the lateral. Further, the manholes that provide vertical access to the main pipes (and the access points for the master/slave reels) may also take advantage of the concepts of the present invention.

As described above (and shown in FIGS. 4 and 5), there are many tool heads that may be used with the robotic device. For example, a lateral cutting device may be attached to the robot to cut intersections with lateral pipes open after relining. The lateral cutting device may take on many forms, with a rotating rasp or blade that allows for the reopening of laterals after a pipe relining process. Likewise, a root cutting attachment may be attached to the robot to cut exposed roots or other debris that infiltrate underground pipes from the outside. This device improves upon the traditional methodologies using chains and blades.

A pipe cleaning tool head may be used to clean a pipe from grease, calcium deposits, or other build-up that may exist within a pipe or conduit. The pipe cleaning attachment may include a brush-type drum with varying degrees of stiffness or other types of heads to clean, sand and/or debur pipes, as necessary.

A protruding lateral trimming tool head may be used with the robot to effectively trim a lateral that protrudes into the main. Additionally, the robot may be integrated with current cleaning technology using high pressure water to directly perform cleaning tasks on a specific area or location. A similar high pressure jet tool could be used to clear debris, such as leaves from the pipes.

Additional attachments for a pipeline rehabilitation robot may include: a pipe joint sealing attachment (used to place joint sealant or other sealing material at each specific joint to stop infiltration, root intrusion, and any other defect that may be required for repair); a pipe joint/lateral testing attachment; a pipe profiler attachment (used to perform specific profiling of a pipe and dimension using laser light to denote pipe deformation and sonar to depict a 3-dimensional image of the conduit in real-time); a pipe sampling attachment (used to take samples at a certain location of the conduit, lateral or pipe junction); and an internal repair attachment (used to repair a pipe using a restraining clamp system or a modified spot repair liner system to address a specific area of concern or defect in the conduit). Tool heads such as grappling attachments, sensors, data acquisition devices, applicators, vacuums, cable layers and internal lining attachments (to pull the CIPP liner through an unlined pipe) may also be used.

In addition to all of the main tools that may be attached to the robot as described above, there is also an almost limitless variety of sensors that may be incorporated into the robot (or a tool attached to the robot) or attached to the robot to sense various characteristics of the robot and its environment. For example, for positioning, the robot preferably includes a tilt sensor for angle relative to gravity, and a inclinometer for feeding back the pipe angle to the remote computer for accurate determination of the tilt of the longitudinal axis.

Communications

Since a wide variety of tool, sensor and control data is passed back and forth to the robot, communications bandwidth is at a premium. Therefore, another preferred feature of the present invention includes converting remote (robot-based) analog signals to digital and then multiplexing the digital signals to the remote computer (at the surface) digitally. Conventionally, robotic communications are made via a straight wire (multi-conductor point-to-point wiring from topside to the robot) or analog multiplexing (multiple analog signals are multiplexed onto a single or a few conductors to reduce the wiring requirement). The present invention preferably uses pure digital multiplexing to carry out its communications tasks.

In more detail, the most commonly used communications system for command and control components (e.g., power supplies, joysticks, switches) includes connections made through a length of umbilical (electrical wires and/or fluid hoses). Each device (e.g., motor or sensor) on the robot is connected through its umbilical by individual conductors to a control component at the other end of the umbilical. The result is a multi-conductor, discreet function umbilical with multiple control interfaces to operate each device. These devices typically provide no (or very limited) feedback to the operator because of the number of conductors that would be required to transmit this information back to the control interface. This would force the umbilical to grow too large for practical use. Audio and video is captured and transmitted in analog form over dedicated coaxial or twisted pair lines in the umbilical, limiting the number of video or audio devices that can be used and leading to decreased signal strength and electrical noise concerns.

Alternatively, some traditional robotic communications systems (typically used with pipe inspection robots), use a multiplexing strategy to combine video, control, and sometimes power all on a single coaxial or twisted pair conductors. To enable this type of functionality, several signals (e.g., video, audio, sensor status, motion feedback information) are encoded or multiplexed onto common conductors and transmitted through the umbilical to another device which can then decode or de-multiplex the information and process it such that a two-way communication and control structure is established. This approach can reduce the number of conductors, but is still limited. Specifically, this system includes a lossy, slow and short analog signaling scheme that requires custom-designed interfaces to be developed.

Both of these communications architectures for remote robotic control are characterized by undesirable limitations. For example, the number of devices and functions per device is limited because of umbilical size. Functionality expansion is limited or nonexistent because added functionality requires changes to hardware/software and a new/altered umbilical with additional conductors. Data rate limitations do not allow for real-time closed loop control, and analog video data must be converted so that the data is compatible with existing sewer databases.

The robotic communications scheme presented as part of the preferred embodiment of the present invention includes a robotic system architecture based on a time-multiplexed, multi-nodal long haul addressable network. For example, the IEEE 1394 multimedia connection standard may be implemented to provide high-bandwidth isochronous (real-time) data interfacing between the robot and a remote (topside) computer. The low overhead, high data rates of IEEE 1394, the ability to mix real-time and asynchronous data on a single connection, and the ability to mix low speed and high speed devices on the same network provides a universal connection for all robotic application envisioned herein. The communications network may also transmit data according to IEEE-1394a, IEEE-1394b, Firewire, IEEE P802.3z Gigabit Ethernet, and USB 2.0, among other similar communications protocols, past and future. Ethernet's use of Quality of Service (QoS) may be advantageous in some embodiments.

The isochronous communications scheme also allows for real-time transfer of sensor, control and other data while utilizing a more conventional, asynchronous, operating system such as Windows™. By using an isochronous communication scheme with an asynchronous operating system, the preferred embodiment of the present invention maintains ease of programming (e.g., to design unique operator user interfaces) and maximizes the flexibility of the design process because more common software tools are available for asynchronous operating systems.

Closed Loop Control

As stated above, if conventional control methodologies were utilized, the umbilical between the robot and the topside computer would need a large number of physical conductors in order to provide true closed loop control of the features of the robot. In the present invention, because of the multiplexed digital communications scheme, closed loop control of time sensitive elements may be handled by local closed loops (e.g., current, velocity and position of motor is monitored in real-time and closed at the robot) and other non-time critical activities may be closed by sending the feedback to the host and having the host close the loop which then sends the control signal information back down to the remote robot.

This closed loop feedback is especially useful for positioning control. In the past, prior systems have merely sent commands to move a tethered robot to a new position. According to the present invention, the position of the robot is sensed and a closed loop feedback scheme, based on the known actual feedback position from the motor, is used to command the robot to move to a new position.

Digital closed loop control may be used for tele-operation control within a pipe, mobility and dead reckoning within a pipe, operator assist features in a pipe (partial human oversight or control), function scripting in a pipe (see below), forced multiplication, and full autonomy in a pipe (no human oversight or control).

In more detail, the closed loop feedback of the present invention works on a variety of different levels. For tasks and communication that require almost immediate response, the closed loop feedback may exist at a local level—completely onboard the robot and the tool/sensor head 60. For decisions that require a slightly slower response time or that may require interaction with a human, the closed loop feedback may exist between the robot and the remote computer 100 (either wired through the umbilical 105, or wirelessly over the air). Finally, for intermittent decisions and high level decision making, various different robot/remote computer subsystems may be connected to a central remote monitor 130 (which may merely be another PC in another place), for example over the Internet 135. This remote monitor 130, which may exist across vast geographic distances from the robot, provides this high level closed loop feedback (see FIG. 6).

GUI and Robot Component Self-Discovery

The Graphical User Interface (GUI) (known generally as a digital dashboard) utilized by the operator has a variety of different functionalities based upon the digital nature of the communications between the robot and the remote computer. In preferred embodiments, the operator navigates the user interface screens and inputs data by way of a conventional personal computer input device such as a joystick, mouse, or keyboard. The functionality of the user interface will be determined by the operator selection of a mode of operation, in one of four main modes.

In the winch/reel control mode, the operator uses the input device to progress the robot forward and backward (longitudinally) in the pipe. In this case, the GUI displays the position of the robot within the pipe calculated based upon the umbilical cable reel odometry system. Additionally, the user interface may include a "record location" function which saves a current location and allows a quick means to relocate the same position during a latter "playback" sequence. This is useful in marking robot positioning adjacent to certain pipe features (e.g., laterals that will need to be cut). The angular position of the robot may be displayed based on an onboard tilt sensor.

The second main mode of the user interface is the robot control mode. In robot control mode, the winch is disabled and the robot is "locked" into position within the pipe. As described above, a variety of different clamping mechanisms may be used. In this mode, the operator may use the input device to move the location of the tool using the onboard motors. The user interface preferably keeps track of the tool position, tool status (e.g., running, stopped, enabled), tool speed (if applicable), and various other sensor data. Digital I/O will be displayed as graphical "buttons" to allow for actuation of devices and scripted functions. These scripted functions and actuations will differ depending on the attached tool.

A third mode of the user interface is teach mode. The teach mode is similar to the robot control mode described above, with the additional feature that it can record all of the axes, sensor states, and I/O states in a sequential list to be used for a subsequent playback. These recorded lists are then editable by the user. The final mode is the playback mode which allows the selection of any recorded sequence from teach mode or any pre-defined path or scripted function sequence.

Preferably (although not required), the various components of the present invention are self-recognizable, and the graphical user interface (GUI) utilized by an operator (e.g., topside) builds itself automatically based upon the detected architecture. This aspect of the present invention is broken up into discovery (identifying the attached components) and GUI presentation (automatically building the appropriate GUI).

The "discovery" process is the process whereby all of the robots features and attached components (including their functionalities) are registered to the system controller. This process occurs automatically as new tool heads and/or sensors are added to or deleted from the robot. In its most basic form, the discovery process includes three fundamental steps: (1) identification; (2) fabrication; and (3) assembly.

During the identification stage, intelligent modules on a plug-and-play network announce themselves to the network. In other words, a robot may be made up of several different component pieces (e.g., a lateral cutting tool, a temperature sensor and a tilt sensor). During the identification phase, each individual component puts some sort of identifying signal on the network bus or its memory is queried for the information. For example, by putting a serial number and product model number on the network, the topside computer recognizes that a new device has been connected and is able to identify the device and its features (taken from a saved database of features for all potential devices).

After identification, during fabrication, each identified component is queried (no configuration file is required) for its functionality and the software robotic components are fabricated. Finally, during assembly, each robot component is queried for its virtual, physical, and electrical connections, and components that can be logically assembled into functional robots are assembled by the software. In other words, a virtual robot (or robots) that logically may be created based on the interconnections identified above are created in the system. This information is used to tailor the GUI as described below.

There are two main steps to the GUI presentation process. First, the capability of the robot is assessed. During the robot component fabrication phase, each robot component publishes its capabilities to the network. During the robot assembly phase, robot level capabilities are published based upon the presence of robot component capabilities. The GUI then queries the robot for its capabilities.

During the GUI assembly process, process level capabilities present themselves in the process control and Process Navigator regions of the GUI. World-view capabilities present themselves in the Windshield region of the GUI. Robot status capabilities present themselves in the dashboard region of the GUI. Diagnostic capabilities present themselves in the diagnostics region of the GUI. These diagnostic capabilities include robot, robot component and hardware level (raw I/O query and control).

The keys to the GUI process include the plug-and-play networking of controls, intelligent controls present in the functional components of the robot (local non-volatile storage identifying the robot component and its configuration parameters, and the self-configuration GUI based upon capabilities.

Figure 8:
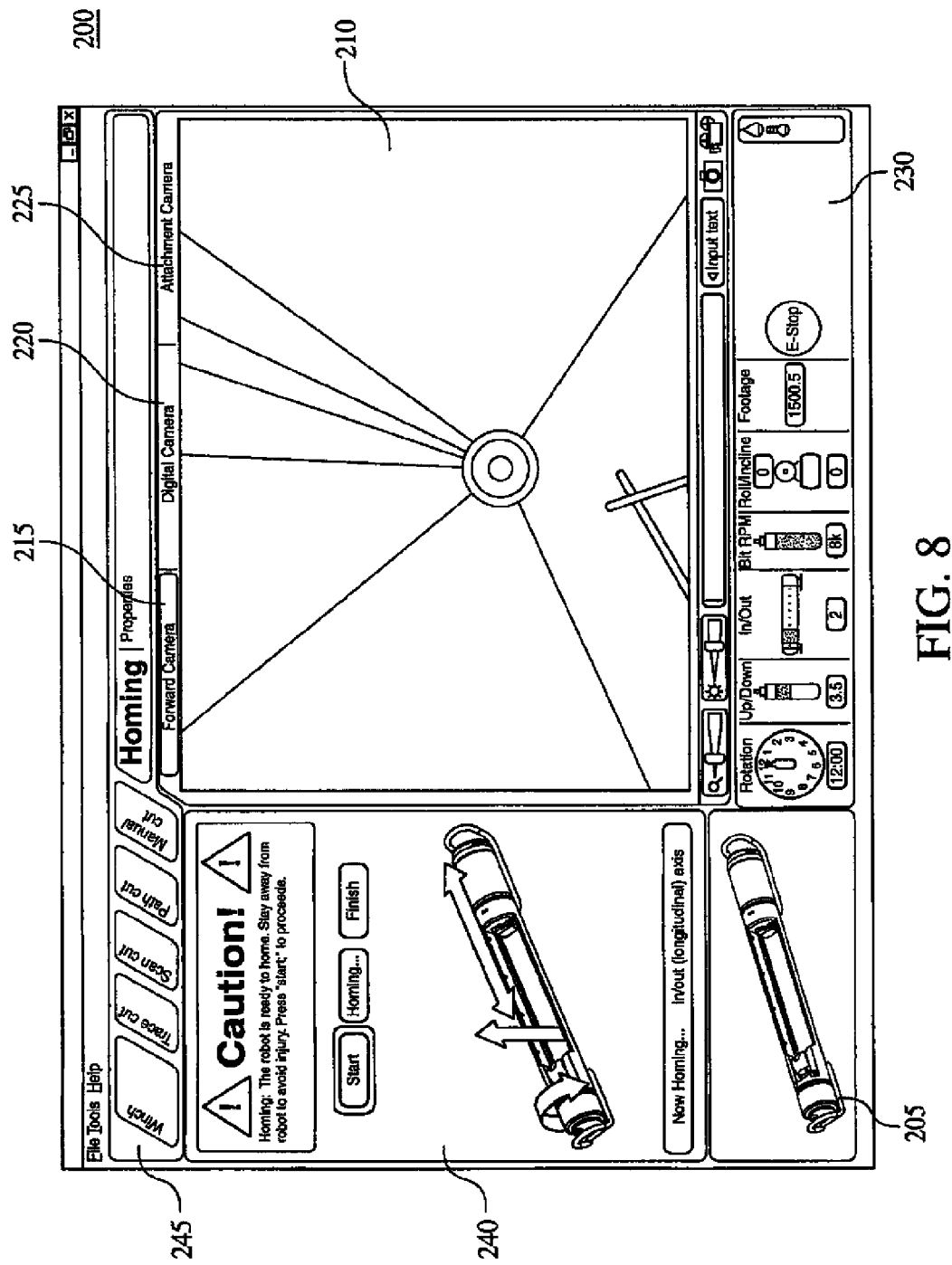
FIG. 8 shows an exemplary GUI for a lateral cutting tool.

FIG. 8 shows one exemplary GUI 200 that has been automatically tailored by the system to only show those functions that are related to a lateral cutting robot 205. The large window in the upper right of the GUI 200 is the "windshield" 210 which currently depicts a real-time camera view from the forward looking 215 (longitudinal) camera. If the operator selects alternative camera views (such as the diagonal 220 and attachment 225 camera selections shown in FIG. 8), then the windshield view 210 will change to reflect that selection.

The lower portion of the GUI is the "dashboard" 230 which reflects the real-time status of certain sensors on the robot. For example, the rotational angle, radial height, and longitudinal length of the tool relative to gravity and the robot chassis is shown in the first three boxes. This information comes to the GUI 200 through the umbilical via onboard sensors. Further, the bit RPM of the lateral cutting tool is shown—this characteristic would not appear if the controller detected that no such lateral cutting device existed. Additionally, the dashboard 230 depicts the roll/incline of the chassis and includes a software-based emergency stop button.

The "control panel" 240 on the left-hand side of the GUI graphically depicts the assembled virtual robot (with lateral cutting tool) and provides customized controls based on the attached tool head and the requested process. FIG. 8 shows a "home" command. Above the control panel 240, the "process navigator" 245 lists the major functions that may be performed by the robot, in this case a lateral cutter. Here, the choices include: "winch" (moving the robot longitudinally within the pipe); "trace cut;" "scan cut;" "path cut;" and "manual cut." These latter options are all different ways to select the cut to be made by the lateral cutter. Throughout the cutting process, if desired, the operator can watch the cutting take place via a real-time camera (attachment camera).

Figure 9:
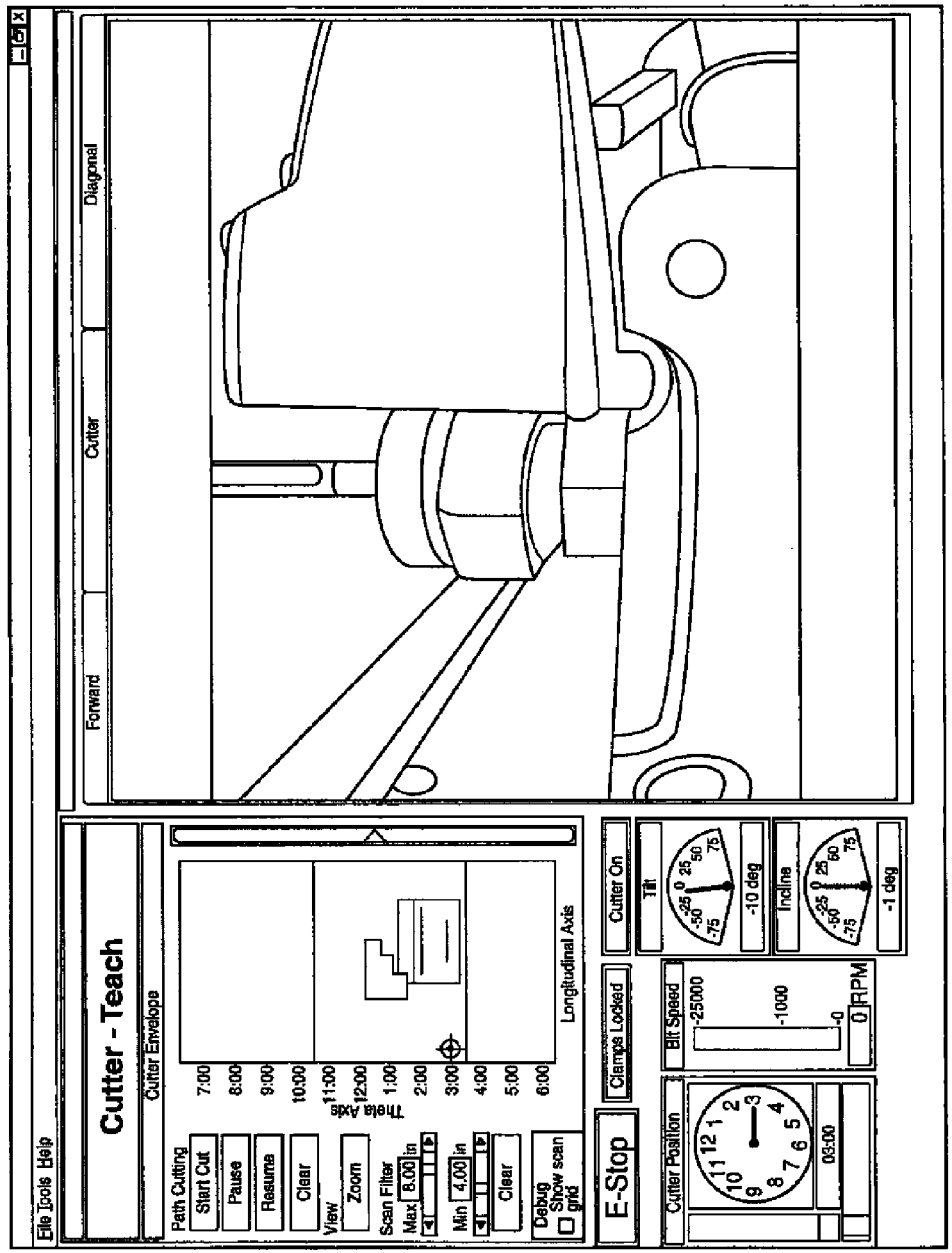
FIG. 9 shows an alternative cutting method via a GUI.
Figure 10:
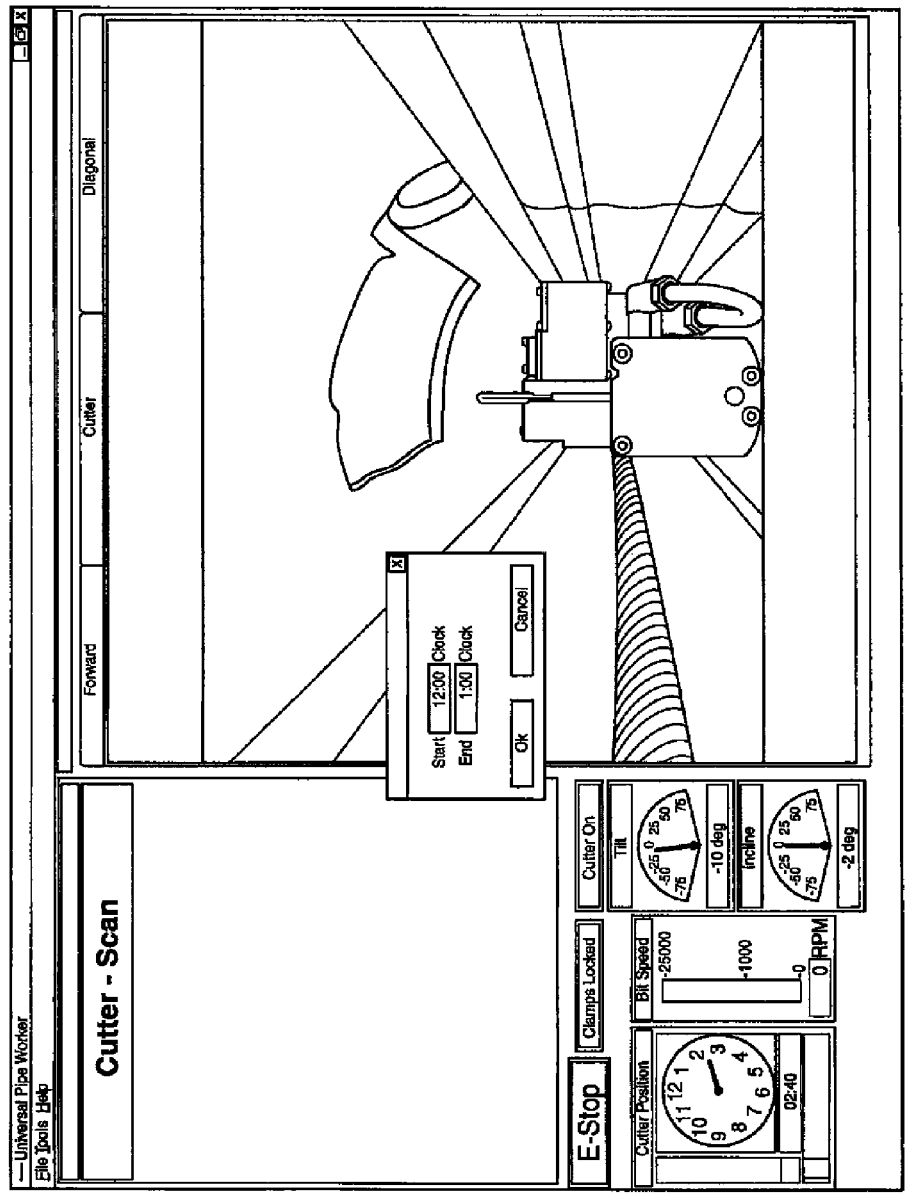
FIG. 10 shows an alternative cutting method via a GUI.

Further, the various cutting (and other work functions) may be controlled by the operator using the GUI in an intuitive fashion. For example, the software of the present invention preferably translates the "real-world" spatial coordinates of the tool head (e.g., the cutting tip) to a two-dimensional contour plot (radial axis shown in color) of the selected region of the pipe (FIG. 9). Using the joystick, mouse or other input device, the operator may then select a portion of the pipe to be cut (or otherwise "worked") in the control panel 240 of FIG. 9. For example, if a square was traced on the two dimensional views of the pipe in the control panel 240 of the GUI, and if a cutting operation was initiated, then the software would translate these coordinates into real-world spatial coordinates and control the tool head (cutter) accordingly. Likewise, without as much operator interaction, previously programmed or "recorded" cuts could be used to generate a real-world cut in the pipe in the same fashion. FIG. 10 shows an additional cutting process based on laser scanning.

Further a program or script can be written to provide easy "access" to repeated functionality. In this way, a script could be written to "pre-program" a button on the GUI to perform a repeated function on pipe. For example, a script may require the robot to orient itself to upright, cut a 2" diameter hole at 12:00 in the pipe (straight up), find a magnetic source in a pipe, and stop in proximity to the magnetic source to perform another series of procedures. The script could be activated, for example, with a mouse click.

The entire architecture is plug-and-play. If a different robot was connected to the network (or if a similar robot had different sensors attached), then the GUI would look completely different. Only those processes that are both feasible (mechanically and electrically possible) as well as safe (according to predefined standards) are displayed to the operator. In this way, the GUI has the maximum amount of usefulness (because the display is automatically tailored to the device) and minimizes operator error (by not allowing certain "dangerous" combinations of activities to occur. This automatic identification and the ease of use of the GUI is a product of utilizing purely digital signaling in the present invention.

Similarly, if more than one robot were strung together via the communications interface, the GUI would identify and adapt to the added functionality. In essence, reconfiguration occurs for different specific robot assemblies as well as different groups of robots connected in a train-like fashion through the common communications interface.

Mobility Options

There are a variety of different mobility options—methods for moving the robot and the attachment head through the pipeline network. Four exemplary methods that may be applied to the present invention include: (1) dual reel/winch (traditional); (2) tug; (3) "inchworm" mobility; and (4) a corkscrew/bending methodology. The conventional dual winch method, in which opposing sides of the robot are attached to winches located at adjacent manholes (the robot in the pipe between the manholes), has been described and is common in the art.

As an alternative, to a dual winch method, a tug may be used to "drive" (push or pull) the robot around the pipe or other space. A tug is a small, mobile, wheeled vehicle that provides the force to move the robot. Control of the tug is preferably provided in line with the rest of the present invention, and the tug may be connected through the common communications channel.

Two unconventional mobility methods may also be used. First, an air bag or bellows attached to the tool head interface may be inflated to pin the air bag against the walls of the pipe. By then moving the tool head interface in the longitudinal (L) direction, because of this pinning, the robot chassis will actually be forced in the longitudinal direction. After movement, the bag can be deflated, moved to the opposite end of the robot, and then re-inflated to "inch" the robot down the pipe.

Likewise a corkscrew approach may be taken. With this approach, one of the end pieces of the robot is bent out of alignment with the longitudinal (L) axis. When this end is then rotated around the longitudinal axis (with the opposite end free), the off-center axis will cause the robot to "screw" its way down the length of the pipe. Any of these mobility methods may be useful in a particular circumstance.

Methods

The previous discussion included a description of an exemplary robotic device with interchangeable tool heads and sensors, a communications and network architecture scheme for use therewith, and an operator GUI that automatically presents the operator with screens that are useful based on the auto-detection of the installed robotic components. Such a system may be used in a variety of different industries for a variety of purposes. To complete this detailed description, some exemplary uses of a robotic device with interchangeable tool heads will now be described.

General Lateral Marking

Position marking is a method of identifying a point (a feature of interest) in a pipe which may serve as a "fiducial" so that the pipe is referenced to a coordinate reference frame. After marking a point and leaving the area, the robot can later sense and return to the marked point, and align itself with the new and old reference frames. Lateral marking (hereafter "marking") is a method of using simple devices or other cues to stake out the location of a lateral in advance of lining (or relining), that can be found again after lining by a cutter robot.

Position markers can be used to register the official starting point datum. The purpose is to designate the zero position from which all odometry is recorded for a particular main and its laterals.

Lateral markers (hereafter "markers") are devices that can be installed at any location on the inside surface of a pipe, prior to re-lining, nearby a lateral (or any other feature of interest) that can be accurately re-located after being covered over with a lining material. In other words, markers must be able to be blindly located using some non-contact and non-visual method, such as magnetics, radio frequency (RF), or metallic identity that is detectable through the liner material. The location of a marker in longitude (L), rotational (T), and radius (R) coordinates can be used by other robotic tool systems, such as the 3-D scanner (laser or otherwise), cable odometry as a zero reference, or calibration reference. Multiple markers can be used in combination to form a reference frame for other sensor data, such as 3-D scans of the edges of a lateral opening.

Figure 11:
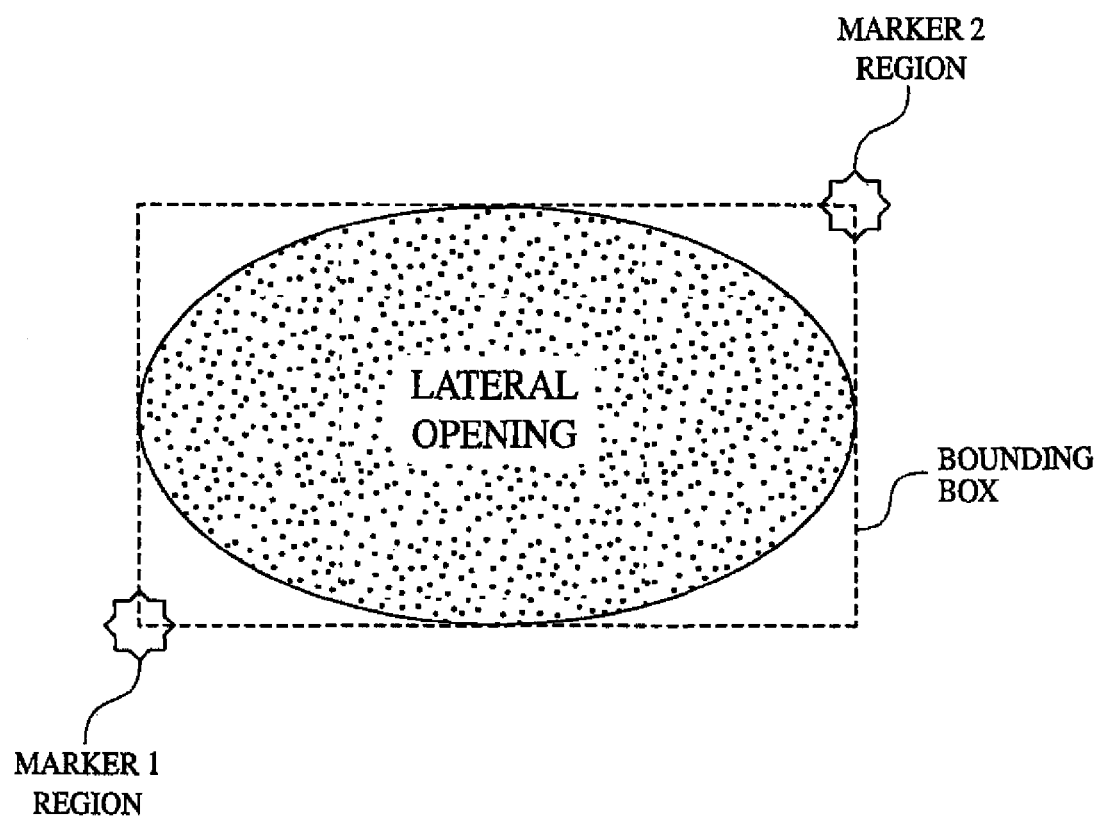
FIG. 11 shows an exemplary bounding box.

The optimal location to place markers is near the extremes of the "bounding box" of the lateral or other feature of interest (see FIG. 11). The distance between markers should be great enough to create a large baseline of L, T, and R coordinates. The markers are not required to be located at the exact extremes of the boundary of the lateral, and can be placed at any location in close proximity to the lateral opening. Markers that are either too close to each other, that have nearly the same L or T coordinate, or that are too far apart will not form an accurate reference frame in most cases.

In some pipe diameters and circumstances, it may not be necessary to determine the radius value from the marker, such being the case for smaller diameter pipes in which the L/R ratio of the robot constrains the amount of pitch relative to the pipe. This may be the case, for example, for 6-10" pipe, while 12" and greater diameter pipes are likely to require the reading of the radius (or may somehow derive the radius) distance for each marker location in order to determine pitch and yaw of the robot in the pipe, both at marker placement time and prior to cutting using marker data. In other cases, measuring and tracking all three (3) coordinates for each marker may not be necessary. Rather, two (2) coordinates is accurate enough based on the accuracy constraints of a particular pipe configuration.

A marker system according to the present invention preferably comprises three main components: (1) the physical markers; (2) a marker reader; and (3) software for signal capture. The physical markers are consumable devices or materials that are permanently placed in the pipe and continuously retain their ability to be sensed once obscured by lining material. A marker reader is the sensor that senses the marker location, giving at a minimum an indication of the presence/absence of the marker, extending to the capability to provide range and direction from the reader to the physical marker. Finally, a software module performs the functions of: signal capture from the reader; search algorithm and command; reference frame construction; and calibration to other sensors, cameras, and scanners. Also, the calibration of markers to pipe odometry, and the use of markers as an index to the overall lateral database are key considerations in the lateral marker management software.

Several technologies have been considered for marking locations within the pipe interior that allow for post-lining detection including magnetic field and metal detection. A magnetic field marker system is characterized by a physical marker with minimal hardware, a low cost and small detector/reader (less than ½" diameter) and high spatial repeatability and position resolution. A metal detection marker system, on the other hand, is characterized by a low cost physical marker, low spatial resolution, and a medium-sized detector for spatial resolution (~several inches in diameter.

A self-drilling, self-locking drill-plug is a preferred mechanical solution to the physical marker design. In such a solution, the drill would be part of the marker itself, so that drill bit changing would be eliminated.

The sequential steps of one preferred method for marker placement and substantial identification routine are as follows:

1. Install marker placement attachment on robot;
2. Load multi-marker magazine loaded with markers (a device that holds a plurality of markers that can then feed the markers to the marker placement attachment).
3. Navigate the robot near the desired marking location (feature of interest).
4. Drill and place marker whereby the robot establishes a coordinate reference point in relation to the marker and other features/points in a pipe. Ensure that the robot remains in a fixed position in a pipe to ensure reliable positioning.
5. After the robot leaves that position, it may return to that position to re-establish the coordinate point in space or the coordinate reference frame.

In some instances, the markers may also have other relevant information concerning the pipe location and features via RFID tag (or another) technology.

Marker Lateral Cutting

The following are preferred steps for a preferred marker lateral cutting method:

1. Perform marker placement near a lateral (or feature of interest) such that the marker may be applied and cutting can be performed in a single robot positioning (i.e., robot will not have to move and cut twice).
2. Additional markers may be placed near the lateral to improve the coordinate reference frame alignment.
3. Identify and record for later use the lateral (or feature of interest) dimensions via captured 3D pipe data or cut path by sensing through a laser scan, camera object recognition, or haptic (touching) method.
4. After the pipe is lined, return the robot to the lateral location by measuring lateral footage (pay out) and by sensing markers to determine the location of the previously applied markers.
5. Index the robot reference frame to the pipe reference frame based on prior marker placement and location.
6. Based on the recorded lateral dimensions in the cut path and the robot position relative to the markers, cut the lateral to the desired shape and location.
7. Perform multiple cuts and coordinate brushing or trimming (finishing) to prior cut laterals.
8. Advance the robot to the next lateral and begin the process again.

Nothing in the above description is meant to limit the present invention to any specific materials, geometry, or orientation of elements. Many part/orientation substitutions are contemplated within the scope of the present invention and will be apparent to those skilled in the art. The embodiments described herein were presented by way of example only and should not be used to limit the scope of the invention.

Although the invention has been described in terms of particular embodiments in an application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered only to facilitate comprehension of the invention and should not be construed to limit the scope thereof.

What is claimed is:

1. A method of performing rehabilitation on a pipeline, the pipeline including a main pipe and at least one feature of interest in the main pipe, the method comprising:
    identifying, using a robotic device, the at least one feature of interest in the main pipe;
    implanting, using the robotic device, at least one marking device into a wall of the main pipe proximate the at least one feature of interest; and
    sensing, using the robotic device, the at least one marking device from within the main pipe, wherein the at least one feature of interest comprises at least one of the following:
    a crack in the main pipe;
    a joint of the main pipe; and
    a lateral pipe connected to the main pipe.

2. The method of claim 1, wherein identifying the at least one feature of interest comprises using the robotic device to perform a video survey of the pipeline.

3. The method of claim 1, wherein identifying the at least one feature of interest comprises using the robotic device to perform range mapping of the pipeline.

4. The method of claim 1, wherein implanting the at least one marking device into the wall of the main pipe comprises implanting a plurality of marking devices into the wall of the main pipe proximate the at least one feature of interest.

5. The method of claim 1, wherein implanting the at least one marking device into the wall of the main pipe comprises using the robotic device to drill into the wall of the main pipe.

6. The method of claim 1, wherein sensing the at least one marking device comprises electromagnetically sensing the at least one marking device.

7. The method of claim 1, further comprising using the robotic device to clear debris in the main pipe.

8. The method of claim 1, further comprising using the robotic device to clean a surface of the main pipe.

9. The method of claim 1, further comprising using the robotic device to trim a lateral pipe of the pipeline.

10. The method of claim 1, further comprising using the robotic device to place a sealing material at a joint of the main pipe.

11. The method of claim 1, further comprising using the robotic device to register a position of the implanted at least one marking device relative to a coordinate reference frame.

12. The method of claim 1, further comprising using the robotic device to cut a lining positioned in the main pipe, wherein the lining obscures a line of sight between the robotic device and the at least one marking device.

13. A mobile robot, comprising:
a chassis; and
a universal interface positioned within the chassis, wherein the universal interface is:
movable relative to the chassis; and
configured for removable connection to a plurality of different attachments, the plurality of different attachments comprising at least two of the following pluralities:
a plurality of different electrically-powered attachments;
a plurality of different pneumatically-powered attachments; and
a plurality of different hydraulically-powered attachments.

14. The mobile robot of claim 13, wherein the universal interface has at least two degrees of freedom relative to the to the chassis.

15. The mobile robot of claim 13, further comprising an attachment removably connected to the universal interface, wherein the attachment is from one of the plurality of different attachments.

16. The mobile robot of claim 15, wherein the attachment from the plurality of different attachments has at least one degree of freedom relative to the universal interface.

17. The mobile robot of claim 15, wherein the attachment from the plurality of different attachments comprises one of the following:
a tool; and
a sensor.

18. A system, comprising:
a mobile robot, wherein the mobile robot comprises:
a chassis;
a universal interface positioned within the chassis, wherein the universal interface is:
movable relative to the chassis; and
configured for removable connection to a plurality of different attachments, the plurality of different attachments comprising at least two of the following pluralities:
a plurality of different electrically-powered attachments;
a plurality of different pneumatically-powered attachments; and
a plurality of different hydraulically-powered attachments; and
a controller communicably connected with the universal interface, wherein the controller is configured to:
automatically identify each attachment when the attachment is connected to the universal interface; and
automatically control the functionality of the mobile robot based on the identified attachment; and
a computing device communicably connected to the controller.

19. The system of claim 18, wherein the mobile robot further comprises at least one sensing device communicably connected to the controller.

20. The system of claim 18, further comprising an attachment removably connected to the universal interface, wherein the attachment is from one of the plurality of different attachments.

* * * * *